United States Patent

Sacco Boschetti

(10) Patent No.: US 7,394,899 B2
(45) Date of Patent: Jul. 1, 2008

(54) DEVICE FOR TRANSFORMING A DIGITAL SIGNAL INTO AN ACOUSTIC ONE, AND THAT MAKES USE OF A STANDARD PHASE MODULATION

(76) Inventor: Paolo Sacco Boschetti, Via del Maggiolino, 125, Roma (IT) I-00155

( * ) Notice: Subject to any disclaimer, the term of this patent is extended or adjusted under 35 U.S.C. 154(b) by 244 days.

(21) Appl. No.: 10/543,381

(22) PCT Filed: Apr. 10, 2003

(86) PCT No.: PCT/IT03/00221

§ 371 (c)(1),
(2), (4) Date: Jul. 26, 2005

(87) PCT Pub. No.: WO2004/071041

PCT Pub. Date: Aug. 19, 2004

(65) Prior Publication Data

US 2006/0147037 A1    Jul. 6, 2006

(30) Foreign Application Priority Data

Feb. 7, 2003    (IT) .......................... RM2003A0050

(51) Int. Cl.
*H04M 1/00*    (2006.01)
*H04M 9/00*    (2006.01)
(52) U.S. Cl. ....................................................... 379/444
(58) Field of Classification Search ................. 379/444, 379/37–45; 455/404.1; 340/506–550, 53, 340/97
See application file for complete search history.

(56) References Cited

U.S. PATENT DOCUMENTS 6,236,889 B1    5/2001    Soykan et al.

*Primary Examiner*—Curtis Kuntz
*Assistant Examiner*—Phylesha L Dabney
(74) *Attorney, Agent, or Firm*—Young & Thompson

(57) ABSTRACT

A device for transforming a digital signal into an acoustic signal, making use of a standard phase modulation, that comprises a modem chip (1) with a phase modulation of known kind, used until now for the data transmission via cable, conceived and used only for a cable connection, for acquiring a digital signal through a serial inlet RS232 and for modulating the same according to a standard record V.22, and an acoustic transducer (2) of the piezoelectric kind guided by the modem chip (1).

20 Claims, 2 Drawing Sheets

DEVICE FOR TRANSFORMING A DIGITAL SIGNAL INTO AN ACOUSTIC ONE, AND THAT MAKES USE OF A STANDARD PHASE MODULATION

BACKGROUND OF THE INVENTION

1. Field of the Invention

The present invention concerns a device that transforms a digital signal into an acoustic signal, making use of a standard phase modulation, and having the purpose of transmitting data through a fix or mobile/cellular telephone line.

2. Description of the Related Art

It is well known that, at present, the transmission of data through acoustic coupling, performed e.g. with a common telephone, has become a quite simple operation, in particular when a standard record is used. However, the known art sets unavoidable limits for making use of said system the reliance whereof remains in any case low. The limits derive from two critical points the technique has not yet been able to overcome:

the need of a perfect alignment between transmitter and receiver (telephone). In fact, when said alignment is not perfect, the data transmission shows a high percentage of error, as it also happens when the two surfaces are not in perfect contact one with the other.

high sensibility to acoustic noise (surrounding) and to vibrations. During transmission it is necessary to remain silent and reduce (or eliminate wherever possible) the surrounding noise because it may alter the acoustic signal to be transmitted.

The need derives from above described situation to adopt special precautions for reducing above mentioned inconveniences to the minimum, whereby they can never be completely eliminated. Some of the devices used for said purpose are listed herein below:

a. rubber bands, or similar accessories, for fixing the transmitter and the receiver so as to assure a better mechanical coupling. In particular, the transmitted must be coupled with the microphone of the telephone receiver, for receiving and consequently transmitting on the telephone line.

b. gaskets, adapters, supports etc. for assuring the sealing between the transmitter and the telephone, in consideration of the great variety of possible shapes of the latter. In fact, some "particular" telephone shapes (especially of the microphone) may even make the coupling impossible. Just think of a telephone with a modem design in which the receiver has a design in the shape of a point, like a pyramid.

c. the so-called acoustic cloth puts between the transmitter and the telephone so as to attenuate the vibrations between the two "machine bodies", which are a sure source of transmission errors.

As far as the kind of modulation used, there exist different modulation techniques, which are characterized in the modulation records used, in error probabilities and transmission speed. There are, e.g., two kinds of modulation used also for the transmission of data through the telephone line:

frequency modulation (FSK)

phase modulation (PSK).

The frequency modulation (FSK) is the one mostly used for transmitting data through an acoustic coupling; it shows the advantage of not being owner and to be able to use a common standard modem; on the other side, it has a low efficiency in terms of relationship signal/noise at equal transmission speed towards other modulation techniques.

The phase modulation (PSK) is a rather efficient modulation technique which allows, in theory, the data transmission at extremely high speed or, if used at a relatively low speed, with an extremely high efficiency. Due to this latter feature, it is widely used for low speed cable transmissions, where a great safety in the data transmission is required (e.g. counters for automatic drawing). Today, the phase modulation is used for the data transmission without cable only in a few cases in which a special owner record has been developed for the acoustic coupling. This implies the disadvantage that, for receiving, a non standard modem must be used that needs, for entering the net, a special approval for the telephone lines o each single Country and this is a limit that slows down the commercial development thereof. Even in the case of an acoustic coupling realized with a phase modulation and a non standard modem, the present art has not been able to solve the above mentioned inconveniences (the need of a perfect alignment between microphone and transducer and the high surrounding noise sensibility).

SUMMARY OF THE INVENTION

It is the aim of the present invention to overcome above mentioned inconveniences by means of a device able to transform a digital signal into an acoustic signal making use of a standard phase modulation, conceived so as to be inserted into a system for the transmission of digital signals via telephone by means of a simple acoustic coupling, shown in a block scheme in FIGS. 1 and 2, in the two data transmission variants through through a fix telephone and through a cellular telephone.

BRIEF DESCRIPTION OF THE DRAWING FIGURES

DETAILED DESCRIPTION OF THE PREFERRED EMBODIMENTS

Figure 1:
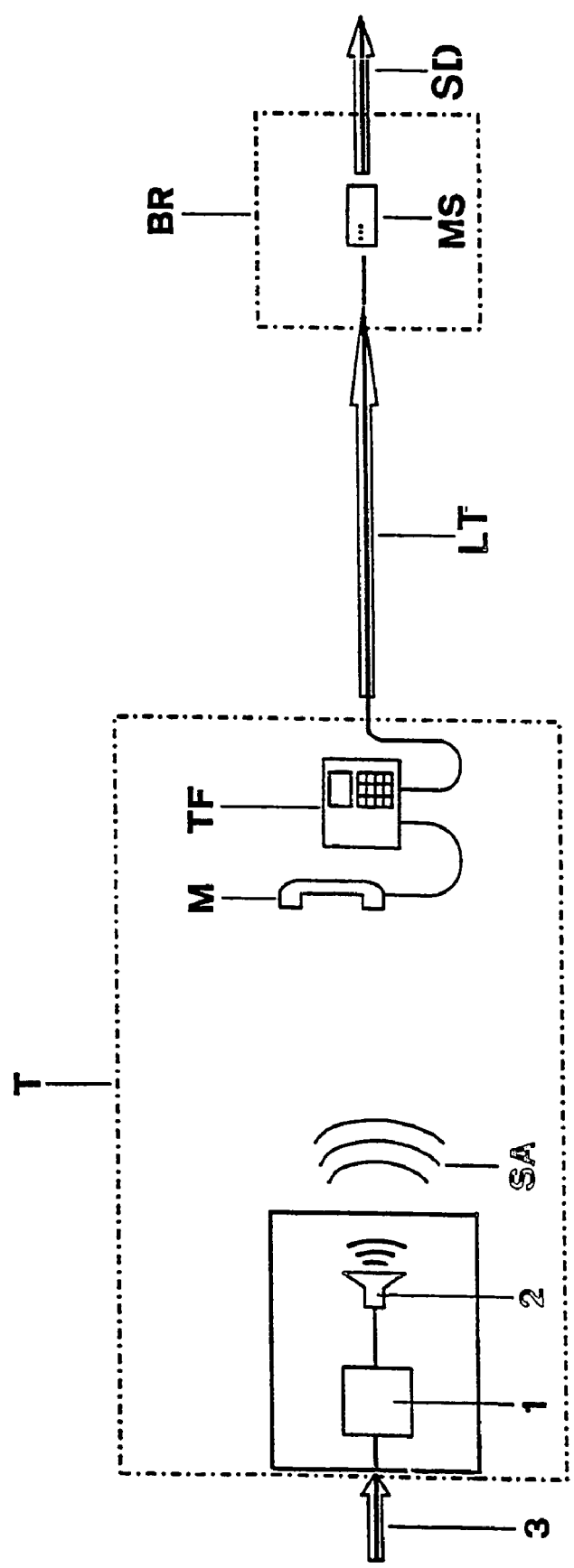
FIG. 1 illustrates a device for transforming a digital signal into an acoustic signal.

FIG. 1 shows a device that transforms a digital signal into an acoustic signal, making use of a standard phase modulation, and the functioning block scheme works through a fix telephone line, consisting of:

a modem chip 1 with a phase modulation of known kind, used until now for the data transmission via cable, conceived and used only for a cable connection for acquiring a digital signal through a serial inlet RS232 and for modulating the same according to a standard record V.22;

an acoustic transducer 2 of the piezoelectric kind guided by said modem chip 1;

a feeding and connecting circuit.

The transmission block T shown in FIG. 1 comprises a telephone apparatus TF with a microphone M that can be reached by an acoustic signal SA, and a telephone line LT connects the same to the receiving block BR consisting of a standard modem MS for the outlet of a digital data signal SD.

Figure 2:
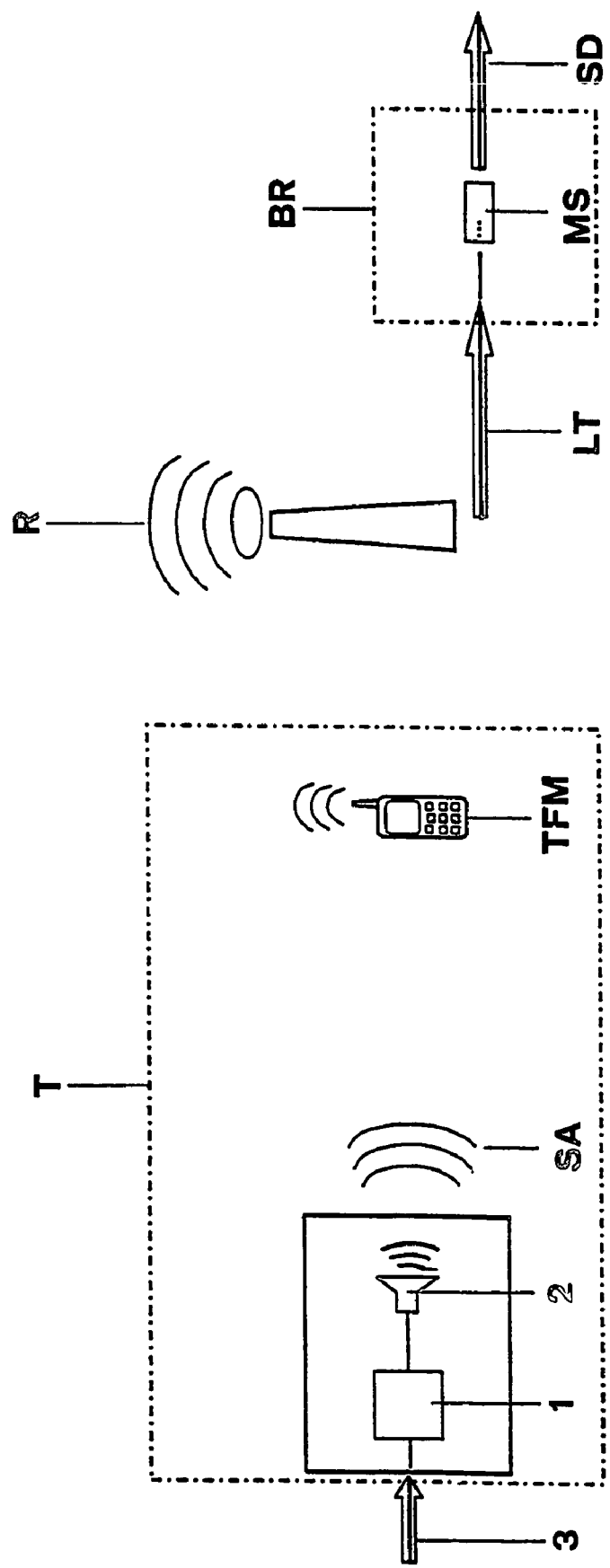
FIG. 2 illustrates a variation of a device for transforming a digital signal into an acoustic signal.

For what concerns the variant of FIG. 2, the transmission block T comprises, instead of the telephone apparatus TF, a mobile telephone apparatus TFM which, through the repeater R, is connected by means of the telephone line LT to the receiving block BR.

The present invention provides the use of the standard phase modulation instead of the frequency modulation commonly used for the transmission of data of acoustic kind. This has been made possible making use of a modem chip (that males use of the standard record V.22) available on the market but, as mentioned above, conceived and used only for a cable connection.

The advantages of the device according to the present invention are many and considerable:

the inconveniences and the respective limits of the actual method are completely overcome and, consequently, it is made possible to perform the transmission in conditions that would be considered impossible according to the present knowledge and that correspond to the situation of simple nearing between transmitter and receiver;

the device allows a reliable data transmission through a telephone line under the following acoustic coupling conditions, where no other similar data transmission device could succeed:

the transducer and the microphone are physically far away, until a distance of one meter;

the transducer and the microphone are not aligned (within a distance of one meter);

the orientation of the operation fields of the transducer and of the microphone is diverging, as—e.g.—in the situation in which they are both resting on a plane with opposed orientation;

the device according to the present invention allows a reliable data transmission through a telephone line under the following acoustic coupling conditions:

a high surrounding noise during transmission;

a telephone apparatus with an irregular shape that does not allow a perfect adherence of the microphone with the transducer.

Under such conditions, any other similar device for the data transmission would succeed only with a considerably lower or very low reliability degree.

the device makes use of the phase modulation of the signal and due to the high efficiency that may be obtained from the latter, it guides an acoustic transducer (a piezoelectric buzzer) of extreme simplicity and extremely low used power (in the range of one micro-watt), instead of a more expensive loudspeaker of the electromagnetic kind. This implies further advantages in terms of costs, lightness/encumbrance and an extremely low electric current consumption (fundamental in a battery-fed pocket-system);

due to the extremely low power used by the device, a greater autonomy of the batteries is obtained: with the same autonomy batteries (or even rechargeable batteries) of lower capacity may be used with advantages, also in this case, in terms of cost, lightness and encumbrance.

Such advantages are particularly important when considering the industrial usefulness of the device according to the present invention, especially relating to mobile devices of tele-medicine.

It appears evident how, due to the device according to the present invention, the cable-less data transmission by acoustic coupling through a common telephone apparatus may become a simple and extremely reliable method if considered to what is available at present.

Due to the reliability obtained, it will be possible to suggest the new system in all situations providing great diffusion, e.g. also for transmitting data in a "tele-medicine" service which thus will become available even to old people with reduced psychomotor capacities or not completely self-sufficient.

The invention claimed is:

1. A device for transforming a digital signal into an acoustic signal, comprising:

a modem chip (1) configured to have a standard phase modulation of a kind for data transmission via cable and only for a cable connection, the modem chip being adapted to acquire a digital signal through a serial inlet RS232 and to modulate the digital signal according to a standard record V.22;

a piezoelectric acoustic transducer (2) configured to be guided by said modem chip (1); and a feeding and connecting circuit, wherein the device employs a standard phase modulation, and the device does not employ frequency modulation.

2. The device according to claim 1, wherein the piezoelectric acoustic transducer (2) is not an electromagnetic loudspeaker.

3. The device according to claim 1, further comprising a telephone line for transmitting reliable data by employing acoustic coupling.

4. The device according to claim 3, further comprising a microphone, wherein the transducer (2) and the microphone are separated by a distance of up to one meter.

5. The device according to claim 4, wherein the transducer (2) and the microphone are not aligned.

6. The device according to claim 4, wherein an operational field of the transducer (2) and the microphone diverge.

7. The device according to claim 6, wherein the transducer (2) and the microphone both rest on a plane with opposed orientation.

8. The device according to claim 1, wherein the transducer (2) is a piezoelectric buzzer.

9. The device according to claim 1, wherein the transducer (2) consumes power at a magnitude of one micro watt.

10. The device according to claim 1, further comprising:

a telephone with a microphone that can be reached by the acoustic signal;

a telephone line connected to the telephone; and a receiving block including a modem.

11. The device according to claim 1, further comprising:

a mobile telephone with a microphone that can be reached by the acoustic signal;

a repeater adapted to receive signals from the telephone; and a receiving block including a modem.

12. A tele-medical device, comprising:

a modem chip (1) configured to have a phase modulation of a kind for data transmission via cable and only for a cable connection, the modem chip being adapted to acquire a digital signal through a serial inlet RS232 and to modulate the digital signal according to a standard record V.22;

a piezoelectric acoustic transducer (2) configured to be guided by said modem chip (1); and a feeding and connecting circuit, wherein the device employs a standard phase modulation, and the device does not employ frequency modulation.

13. The device according to claim 12, wherein the transducer (2) is not an electromagnetic loudspeaker.

14. The device according to claim 12, further comprising a telephone line for transmitting reliable data by employing acoustic coupling.

15. The device according to claim 14, further comprising a microphone, wherein the transducer (2) and the microphone are separated by a distance of up to one meter.

16. The device according to claim 15, wherein the transducer (2) and the microphone are not aligned.

17. The device according to claim 15, wherein an operational field of the transducer (2) and the microphone diverge.

18. The device according to claim 17, wherein the transducer (2) and the microphone both rest on a plane with opposed orientation.

19. The device according to claim 12, wherein the transducer (2) is a piezoelectric buzzer.

20. The device according to claim 12, wherein the transducer (2) consumes power at a magnitude of one micro watt.

* * * * *